INVENTOR.
STEVEN S. DAVIS

Dec. 31, 1968   S. S. DAVIS   3,419,150
DRUM FILTER OF MOLDED CONSTRUCTION
Filed Sept. 21, 1967   Sheet 3 of 3

INVENTOR.
STEVEN S. DAVIS
BY Robert R. Finch
ATTORNEY

United States Patent Office 3,419,150
Patented Dec. 31, 1968

3,419,150
DRUM FILTER OF MOLDED CONSTRUCTION
Steven S. Davis, Bountiful, Utah, assignor to The Eimco Corporation, Salt Lake City, Utah, a corporation of Delaware
Filed Sept. 21, 1967, Ser. No. 669,431
5 Claims. (Cl. 210—401)

ABSTRACT OF THE DISCLOSURE

A rotary drum vacuum filter in which the drum comprises a cylindrical portion made up from molded arcuate sectors with molded headers closing the end, the molded headers have hubs and/or trunnions as well as necessary piping. For conversion of the filter to endless belt operation a simplified molded attachment is provided.

---

This invention is directed to rotary drum filters and in particular to a filter construction wherein the drum and other major components of the filter are molded for ease of manufacture as well as assembly into a complete filter and also to enable the use of plastics or other unusual materials in manufacture.

Heretofore drum filters with or without attachments for endless belt operation have been constructed from metal components welded or bolted together. Such construction has been and still is satisfactory for many uses but due to the increasing costs of labor and steel, particularly special steels as required for food handling or to resist chemicals, their cost is becoming prohibitive. In the case of small filters, the cost of metal construction is disproportionately high due to the labor involved.

It is the principal object of this invention to provide a rotary drum filter construction in which the drum comprises a plurality of molded plastic segments which, upon assembly, cooperate to provide a highly efficient drum including trunnions, a drainage deck, and necessary piping for vacuum application and filtrate removal.

A further object is to provide a filter design that includes components adapted to be molded from plastic. in precision molds.

Another object is to provide a drum so constructed that several drum cylinders may be joined to form a drum of increased face width.

A still further object is to provide a web support attachment for converting a drum filter to endless belt operation in which the fixed and movable bearing housings along with their associated mechanisms are protectively housed. A related object is to provide such an attachment for a construction adapted to be molded of plastic or similar materials.

Briefly, the filter drum of the invention comprises a cylindrical drum closed at both ends by headers. The curved outer drum surface is imperforate but is ribbed parallel to the drum axis to provide a drainage deck. The drum is made up from a plurality of molded arcuate sectors each of which is bounded on all edges by inwardly extending wall portions which provide flanges for securing adjacent sectors together and for securing the end headers thereto to close the drum ends.

The headers are also molded and each includes a central hub or trunnion by which the drum is journalled for rotation. At least one end header is formed from two complementary facing parts which, when fitted together, form internal passages for vacuum application and filtrate withdrawal; further passages are formed in the associated trunnion to provide communication through the filter valve with the vacuum source and the filtrate receiver.

In order that the invention may be more readily understood and carried into effect reference is made to the accompanying drawings and the description thereof which are offered by way of example and not in limitation of the invention, the scope of which is defined by the appended claims and equivalents thereof rather than any preceding description.

Figure 1:
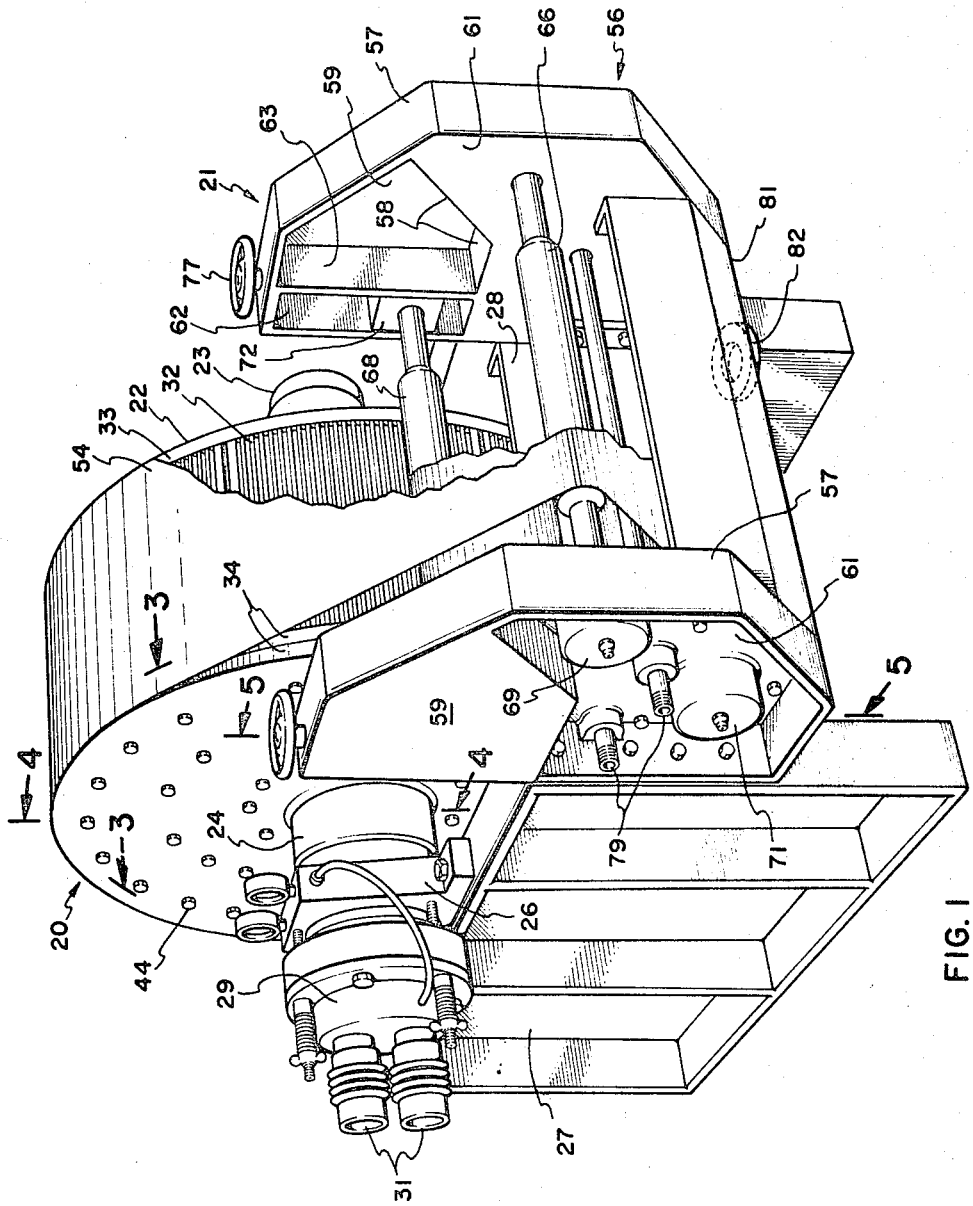
FIG. 1 is a front perspective view of a continuous rotary drum endless belt filter embodying the present invention.

As best shown in FIG. 1, the illustrated embodiment is of an endless belt rotary drum filter comprising generally a filter section 20 combined with a cake discharge web cleaning section 21.

The filter drum 22 is provided with trunnions 23 and 24 at the drive and non-drive ends respectively. The trunnion 24 is journalled in a trunnion bearing 26 at the non-drive end of the drum and trunnion 23 is journalled in a similar bearing (not shown) at the opposite end. Both trunnion bearings are supported on walls 27 at opposite ends of the drum. A feed tank 28 is also supported between these walls.

As is conventional, the drum will be rotated by a suitable gear box and motor (not shown) connected to the trunnion 23.

At the non-drive end of the drum, the trunnion 24 connects to a filter valve 29 which communicates with a vacuum source (not shown) through conduits 31 and which functions in known fashion to apply vacuum to successive portions of the drum surface as it rotates.

Figure 2:
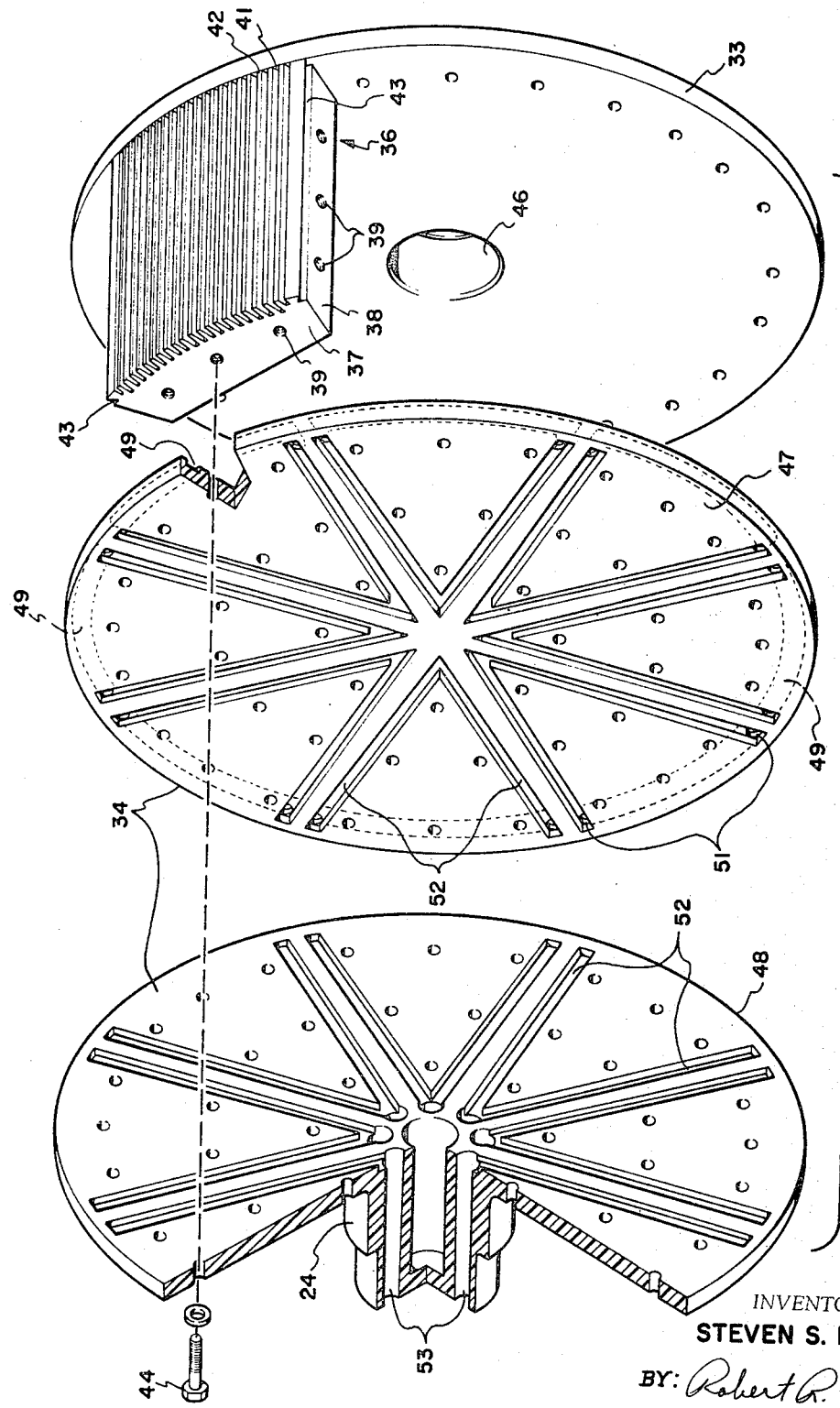
FIG. 2 is a pictorial exploded view of a disassembled drum of the invention showing its several major elements. In the figure one element is rotated for clarity and many identical pieces have been omitted for simplicity.
Figure 3:
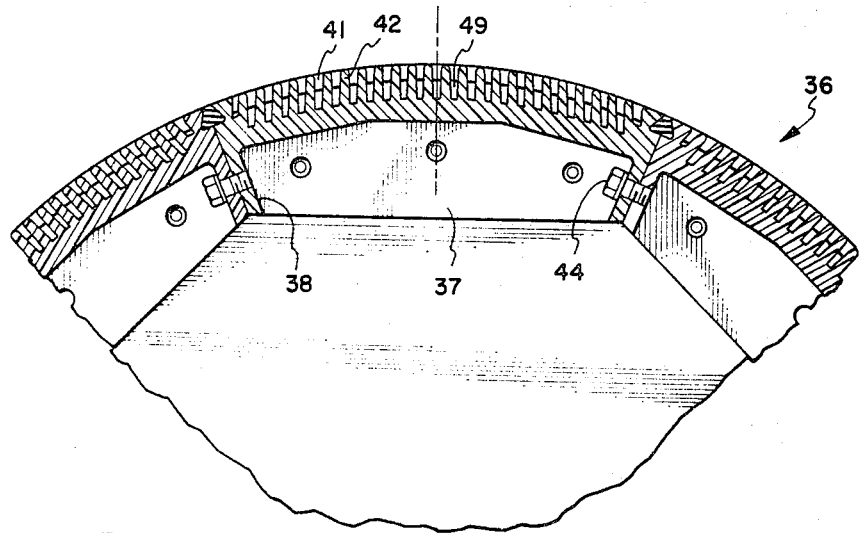
FIG. 3 is a sectional view of the filter drum taken in the plane of line 3—3 of FIG. 1 looking in the direction of the arrows.
Figure 4:
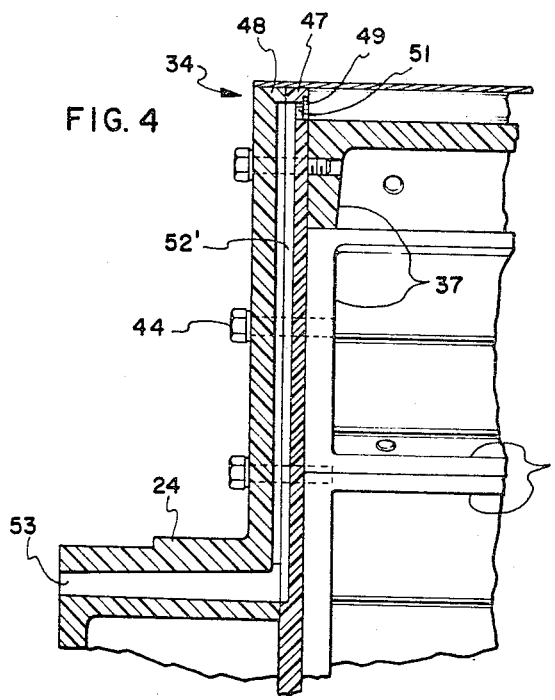
FIG. 4 is another sectional view of the drum taken substantially in the plane of line 4—4 of FIG. 1 looking in the direction of the arrows.
Figure 5:
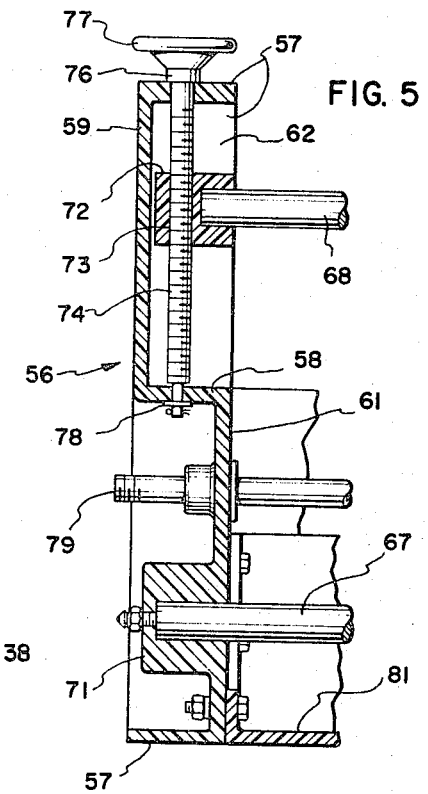
FIG. 5 is a vertical section of one of the end brackets of the web aligning attachment taken substantially in a plane along line 5—5 of FIG. 1 looking in the direction of the arrows.

As illustrated in FIGS. 2–4, the drum comprises a plurality of individual components each of which is of construction such that the filter may be readily assembled into a strong efficient unit. The components are also of construction that can be molded from selected plastics as desired.

Basically, the drum 22 comprises three major sections, the cylindrical section 32, the drive end header 33 and the non-drive or valve end header 34.

The cylinder comprises a plurality of identical arcuate sectors or segments 36 each defined by the same radius and corresponding to a specific angular section of a circle. The number of sectors required for a complete cylinder will depend on the design employed but will usually be from 8–12. Flanges are formed along all edges of each segment. The flanges 37 at the sector ends are in a plane perpendicular to the drum axis so that in addition to providing structural strength they also provide means by which the headers are bolted to the cylinder or, alternatively, by which sectors may be secured to each other as modules of a longer drum.

The edge flanges 38 run from end to end of each sector and extend inwardly along a plane radial to the drum axis thereby providing strong and accurate means for assembling and securing the sectors together as a true cylinder. Suitable bolt holes 39 are provided in all of the flanges and in the headers 33 and 34 for assembly.

Each sector is imperforate so that when the drum is assembled with the headers in place, it is water tight. Filtrate drainage and support of the filter medium on the drum is effected respectively by grooves 41 defined between ribs 42 extending lengthwise of the sectors, that is, from end to end of the cylinder and transverse to the path of its rotation.

In the illustrated embodiment, except for the ribs at the center of each sector, the ribs do not extend radially with respect to the drum axis but are parallel to each other. This facilitates molding of the sectors since the sector may be readily removed from a mold without damage to individual ribs. The sectors may be shaped to form an undercut caulking groove 43 at the edge joint between adjacent sectors.

In connection with molding of the sectors, a simple mold design can be employed using a two or three piece back section or core to enable removal of the completed sector even with its inwardly tapered edge flanges. As previously noted, the surface ribs are parallel to each other and normal to a chord of the sector hence are easily released from the mold. The undercut caulking groove is easily formed with a removable die in the mold.

As noted, the headers 33 and 34 close the drum ends. The drive end header 33 comprises a rigid disc of diameter equal to the outer diameter of the completed cylinder and is bolted to the end flanges 37 by bolts such as 44 desirably formed from molded plastic. The header has a center hub portion 46 to which the trunnion 23 is secured.

The other header 34 at the valve end is also the same diameter as the drum but is of special design comprising two pieces, an inner piece 47 and an outer piece 48 which are constructed so that when fitted together in face to face relationship they cooperate to form passages connecting the corrugated filter deck with the filter valve 29.

The inner header section 47 is located next to the drum and has a plurality of arcuate channels 49 in its face adjacent its periphery. Each channel is of the same length as a sector width and the header is positioned so that each channel communicates with all the grooves of a single sector so that fluids flow from the grooves to the channel. Ports 51 are provided at each end of each arcuate channel 49 and extend completely through the inner header piece to communicate with further passages as hereinafter explained. Except for these ports, the inner header is imperforate when the drum is assembled.

On the reverse face of the inner header are formed a plurality of pairs of channels 52 extending generally radially inwardly from the ports 51 toward the trunnion.

The outer header member 48 has similar pairs of channels 52 and is secured in face to face relationship with the first header member 47 so that confined passageways 52' are formed therebetween. It is not required that channels exist in both header members but provision thereof increases the size of the flow passages and this is usually desirable from the standpoint of filtration capacity.

The outside header includes an integral central trunnion 24; and a plurality of axially directed passages 53 are molded in the trunnion at radially spaced intervals about its center line to provide communication between the confined passages 52' and the filter valve 29. Preferably the trunnion passages 53 will communicate with the paired internal channels 52' at the apex where they join.

By arranging the passages in pairs and connecting one passage to each end of an arcuate channel 49 as illustrated, vacuum is applied to both the leading and trailing edges of a sector.

For operation as a conventional drum filter, a suitable medium is permanently fitted to the drum surface, and scrapers or other usual discharge aids are provided.

For operation as an endless belt filter, the filter medium is formed as an endless web 54 and the cake discharge and web cleansing functions are performed remote from the drum. To accomplish this, the support attachment 21 is provided which includes specially formed end brackets 56 securely fastened to the filter walls 27 to extend forwardly thereof. Each end bracket is formed with a web 57 bounding its entire peripheral edge normal thereto, and an internal rib 58 divides the resulting closed space into two sections. One section is covered on the outside by a flat outer plate 59 and the other section is covered on the inside by a flat inner plate 61. Thus, as shown, a generally upper portion of the bracket is formed with an inwardly facing opening and the lower portion with an outward facing opening. A channel 62 is also defined in the inwardly facing opening by a further rib 63 extending parallel to the back section of the peripheral web 57.

A plurality of web support rolls including a discharge roll 66 an idler roll 67 and a tension or takeup roll 68 extend between the end brackets and are journalled for rotation respectively in bearings 69, 71, and 72. The discharge roll 66 and idler roll 67 are fixed in position hence their bearings 69 and 71 are molded as integral parts of the end brackets with their outer housings extending outwardly of the plate 61 to be protectively housed in the outwardly facing opening surrounded peripherally by the web 57. Suitable grease nipples are provided for lubrication.

The tension roll 68 is journalled in a molded bearing block 72 and this block is adjustably mounted in the channel 62. The block 72 is dimensioned to slide in the inwardly facing channel and is formed with a threaded bore 73 extending therethrough parallel with the long axis of the channel. A threaded shaft 74 is threaded through the bore and is journalled at both ends of the channel. At the upper end, a shoulder 76 bears against the web 57 to absorb thrust; and a hand wheel 77 facilitates rotation of the shaft to adjust the roll. A washer and pin arrangement 78 at the lower end of the shaft holds it against withdrawal from the channel.

Wash pipes 79 also extend between the end brackets as does a wash trough 81 which is equipped with a usual discharge port 82.

In operation, the endless web filter medium 54 is trained about the drum thence successively about the discharge roll 66 the idler roll 67 and the tension roll 68 before return to the drum. As an aid in maintaining the web in proper alignment a suitable aligining device may, if needed, be provided from among the several known devices available for that purpose.

From the foregoing it is apparent that the present invention provides a rotary drum filter of unique design in which the entire drum, including drainage deck, vacuum and filtrate passages and even trunnions, is formed from molded segments easily assembled into a completed filter. The design enables molding of the filter from relatively inexpensive plastics, desirably thermal plastics, that provide sanitary or corrosion proof or chemical resistant construction as the situation demands. Moreover, the filter is useful as a direct replacement of even mild steel filters especially in the smaller sizes where labor is disproportionate to the material cost.

In connection with molding of the end brackets for the belt filter attachment, it will be noted that they are designed without undercuts and with transverse intersects substantially normal thus enabling removal of large rigid parts from the mold.

The filter may be constructed from various plastics, the selection thereof being dependent upon the service in which the filter will be employed and the bearings may be molded from suitable bearing material thus avoiding the use of sepaarte bearing liners.

I claim:

1. A filter drum of the type including a cylinder, a drainage deck on the outer surface of said cylinder for supporting a filter medium and for withdrawing fluid from beneath said medium, headers closing the opposite ends of said cylinder, each said header being of a diameter at least equal to that of said cylinder including said deck, and passages for conducting fluids from said deck and from said drum, characterized in that said cylinder comprises a plurality of molded imperforate arcuate sectors each corresponding to an angular segment of a circle, the edge walls of each sector including surfaces tapering radially inwardly, means connecting said edge walls of adjacent sectors together to form said cylinder, means securing said headers to said cylinder to close said drum, said filter medium supporting means and the means for withdrawing fluid from beneath said medium including a plurality of spaced grooves defined by spaced apart upstanding ribs each having side walls and a top wall integrally formed on the imperforate upper surface of each of said sectors, the side walls of said ribs extending substantially from end to end of said cylinder and parallel to each other whereby the molded sectors may be readily removed from a mold without damage to the individual ribs.

2. A rotary drum filter in which the drum includes an imperforate cylindrical section, headers closing opposite ends thereof, and trunnions on said headers for journalling the drum for rotation, characterized in that said cylindrical drum section comprises a plurality of molded arcuate sectors each corresponding to an angular segment of a circle and having radially extending edge walls, means connecting the edge walls of adjacent sectors together to form said cylindrical section, a plurality of spaced grooves defined by spaced apart upstanding ribs each having side walls and a top wall integrally formed on the imperforate upper surface of each of said sectors, the side walls of said ribs extending substantially from end to end of said cylinder and parallel to each other thereby providing support for a filter medium on the top walls of said ribs and the grooves between the ribs for the passage of drainage fluids and whereby the molded sectors may be readily removed from a mold without damage to the individual ribs.

3. A filter according to preceding claim 2 in which a flange extends inwardly from each edge of each of said arcuate segments, said flanges extending from the end edges of said sectors are in a plane substantially perpendicular to the axis of said drum and the flanges extending from the side edges of said sectors are in a plane radial to said drum axis.

4. In a continuous belt filter of the type including a filter section having a tank for containing feed slurry, a drum on which filtration occurs as it rotates through feed slurry in the tank, a filter medium in the form of an endless belt trained about the drum and a cake discharge filter medium cleaning attachment mounted on said filter and containing rolls over which said filter medium is trained and which includes spaced apart end brackets between which several rolls are journalled for rotation, the improvement in construction of said end brackets of said attachment to render them moldable comprising each bracket being formed with a first rigid web of substantial width defining its periphery and arranged normal to the plane thereof, a second rigid web transverse to the area defined inside said first web and dividing said area into first and second enclosed areas, a plate normal to said webs and secured to one edge thereof thereby covering one side of said first enclosed area and defining a first opening facing in one direction, a second plate secured to the opposite edge of said webs covering said second enclosed area to define a second opening facing in the opposite direction from said first opening, at least one substantially straight walled bearing housing contained within one of said openings and said bearing housings opening through the plate closing said opening whereby operative access to the bearing is through said plate and said housings are protectively housed within said opening.

5. A rotary drum filter in which the drum includes an imperforate cylindrical section, headers closing opposite ends thereof, trunnions on said headers for joining the drum for rotation, a plurality of molded arcuate sectors forming the cylindrical drum section, ribs formed on the outer surfaces of the cylindrical section parallel to the axis of said drum and extending from end to end thereof to provide support for a filter medium on said ribs and grooves for the passage of fluids between said ribs, at least one of the headers being molded and formed with passages internally thereof extending from adjacent its center to a location adjacent its periphery, a plurality of arcuate channels in the header surface adjacent said grooves formed by the ribs, port means connecting said passages with the channels and outlet port means adjacent the center of the header for withdrawing fluid from said internal passages, further said one header comprises first and second disc-like sections in face to face relationship, said first disc being provided with said plurality of arcuate channels on one surface adjacent its periphery, each of said channels communicating with the ends of said grooves on the surfaces of said sectors, a hub member on said second disc, a plurality of confined passages formed between said first and second discs and extending radially from a location adjacent said hub to the periphery of said header, and at least one port in each of said arcuate channels on said first disc providing communication between said channel and the outer end of one of said confined passages in said header, and port means extending from outside of said header through said second disc to communicate with said confined passages.

References Cited

UNITED STATES PATENTS

| | | | |
|---|---|---|---|
| 2,124,828 | 7/1938 | Neil | 210—404 |
| 3,013,666 | 12/1961 | Krynski | 210—404 |
| 3,175,691 | 3/1965 | Watson | 210—404 |
| 3,225,935 | 12/1965 | Porteous | 210—404 |
| 1,868,883 | 7/1932 | Campbell | 210—404 X |
| 2,454,134 | 11/1948 | Burleson | 210—404 |
| 2,669,910 | 2/1954 | Trotman | 210—402 X |
| 2,823,806 | 2/1958 | Harlan | 210—401 X |
| 3,356,224 | 12/1967 | Orr | 210—401 |

REUBEN FRIEDMAN, *Primary Examiner.*

U.S. Cl. X.R

210—404